United States Patent
Lalin

[11] Patent Number: 5,251,489
[45] Date of Patent: Oct. 12, 1993

[54] FLUID FLOW MEASURING DEVICE

[76] Inventor: Hill S. Lalin, 10 Bonita Ter., Wayne, N.J. 07470

[21] Appl. No.: 781,501

[22] Filed: Oct. 22, 1991

[51] Int. Cl.$^5$ .............................................. G01F 13/00
[52] U.S. Cl. .......................................... 73/861; 73/3; 73/250
[58] Field of Search ............... 73/3, 239, 250, 861.05, 73/270, 861

[56] References Cited

U.S. PATENT DOCUMENTS

| | | | |
|---|---|---|---|
| 2,014,664 | 9/1935 | Nicholls | 73/250 |
| 3,101,616 | 8/1963 | Klein | 73/250 |
| 3,181,360 | 5/1965 | Hederhorst | 73/270 |
| 3,635,214 | 1/1972 | Rand et al. | 128/2.08 |
| 4,067,239 | 1/1978 | Arvisenet | 73/270 |
| 4,240,291 | 12/1980 | Andersson et al. | 73/239 |
| 4,398,428 | 8/1983 | Kato et al. | 73/861.05 |
| 4,644,976 | 2/1987 | Peter et al. | 138/31 |
| 4,823,598 | 4/1989 | Carpenter et al. | 73/232 |

OTHER PUBLICATIONS

Califlow Flowrate Calibrater Product Literature Of Arcstart Inc. Feasterville Pa. 3 pages.

*Primary Examiner*—Herbert Goldstein
*Assistant Examiner*—R. L. Biegel
*Attorney, Agent, or Firm*—E. Lieberstein

[57] ABSTRACT

A fluid flow measuring device having a positive displacement piston in a precise bore glass flowtube, with flexible diaphragms at opposite ends of the flowtube, to seal the flowtube from the ambient environment. The flowtube is filled with a pure fluid or gas for uncontaminated operation of the piston. Movement of the piston within the sealed flowtube is controlled by controlling the movement of each diaphragm. The diaphragms are supported in a housing connected to each opposite end of the flowtube, with a plenum chamber in communication with each diaphragm, and with means for the ingress and egress of the fluid under flow measurement with the plenum chamber.

16 Claims, 5 Drawing Sheets

FLUID FLOW MEASURING DEVICE

FIELD OF THE INVENTION

This invention relates to a fluid flow measuring device using a positive displacement piston.

BACKGROUND OF THE INVENTION

The measurement of fluid flow is becoming increasingly more important in the application and control of many processes, as well as in the research laboratory. The ideal fluid flowmeter will not load down the system in which flow is being measured, has absolute accuracy, and can function as a primary standard for gas or liquid flow measurement and calibration. One type of flowmeter and calibrator for measuring gas flow is the soap film flowmeter. In its basic form, a soap film is generated from a soap solution and is propelled through from one end of a flowtube to the other by the gas flow under measurement. By timing the rise of the soap film between designated positions along the flowtube, the gas flow rate can be readily computed. The advantage of this system is that the soap film is virtually massless, and the seal between the soap film and the tube wall is essentially leakproof, thereby providing a measurement of close to ideal accuracy. The disadvantages are primarily due to the expediency of a soap solution to form the soap film, which makes the device somewhat unwieldy for field operation. Moreover, the humidity of the sampling media must also be controlled.

Another type of flowmeter is the positive displacement piston flowmeter. The use of a free piston movable in a close-fitting tube as a flow rate device has been known for over fifty years. In general, most conventional flowmeters using a free piston mounted in a precision bore glass tube rely on a mercury-wetted, frictionless seal between the piston and the bore. A system which consists of a piston whose coefficient of expansion is similar to the precision glass bore tube to maintain an especially tight seal with exceptionally low leakage is very well known and has been used as a damper. The advantages of a piston-type flowmeter is :ts simplicity of operation and practicality for use in all types of field conditions. However, it is highly sensitive to condensation and contamination from dirt and dust. The presence of dirt or dust in the flowtube will vary the differential pressure requirements required to drive the piston and affect its measurement accuracy. In fact, the tolerance between the piston and cylinder for the precision bore dashpot is so tight that dust or dirt can totally inhibit operation. Heretofore, this mandated sophisticated filtering systems which substantially increases size, manufacturing costs and places an additional load on the system.

SUMMARY OF THE INVENTION

An improved fluid flow measuring device has been developed in accordance with the present invention, using a precision bore cylindrical flowtube and a tightly fitted piston for movement within the flowtube in response to the fluid flow under measurement, which operates with the flowtube enclosed in a dry, preferably inert gas, atmosphere impervious to contamination from dirt and dust normally present in the atmosphere, as well as from condensation.

The fluid flow measuring device of the present invention broadly comprises:

a hollow flowtube having first and second opposite open ends and a movable piston disposed therein for movement between said opposite ends, respectively;

first means for enclosing said first open end of said flowtube, with said first means comprising: a flexible diaphragm for sealing said flowtube at said first open end from the ambient atmosphere; a housing surrounding said flexible diaphragm; a plenum chamber in said housing adjacent said flexible diaphragm, with said flexible diaphragm separating said plenum chamber from said flowtube; inlet means for connecting said plenum chamber to an external source of fluid; valve means connected to said housing and having an open position in which said plenum chamber is open to the atmosphere for causing said piston to move to said second open end, and a closed position for causing said piston to move to said first open end; means connected to said flexible diaphragm for switching said valve means into said open position when said piston reaches a position adjacent to said first open end; and means for switching said valve means into said closed position when said piston reaches a position adjacent to said second open end;

second means for enclosing said second open end of said flowtube, with said second means comprising: a diaphragm for sealing said flowtube at said second open end from the ambient atmosphere; a housing surrounding said diaphragm, said housing having a plenum chamber adjacent said diaphragm on one side thereof in communication with said second open end of said flowtube and a cavity adjacent the opposite side of said diaphragm; inlet means for coupling said cavity to said external source of fluid; and means for optically detecting the movement of said piston between selected positions along said flowtube. The device can be mounted vertically, which is preferred, or horizontally. The flowtube device of the present invention may be used to measure a gas flow or a liquid flow. Means are also provided to automatically equalize the pressure in the sealed-off upper and lower piston chambers on opposite sides of the piston. The device is operable either manually, with the piston returning to a normal starting position, such as at the bottom end of the flowtube for a vertically mounted flowtube, or automatically, in which the piston reciprocates from one end to the opposite end of the flowtube and back in a continuous fashion.

BRIEF DESCRIPTION OF THE DRAWINGS

Other features and advantages of the present invention will become apparent from the following detailed description of the invention when read in conjunction with the accompanying drawings of which.

DETAILED DESCRIPTION OF THE INVENTION

Figure 1:
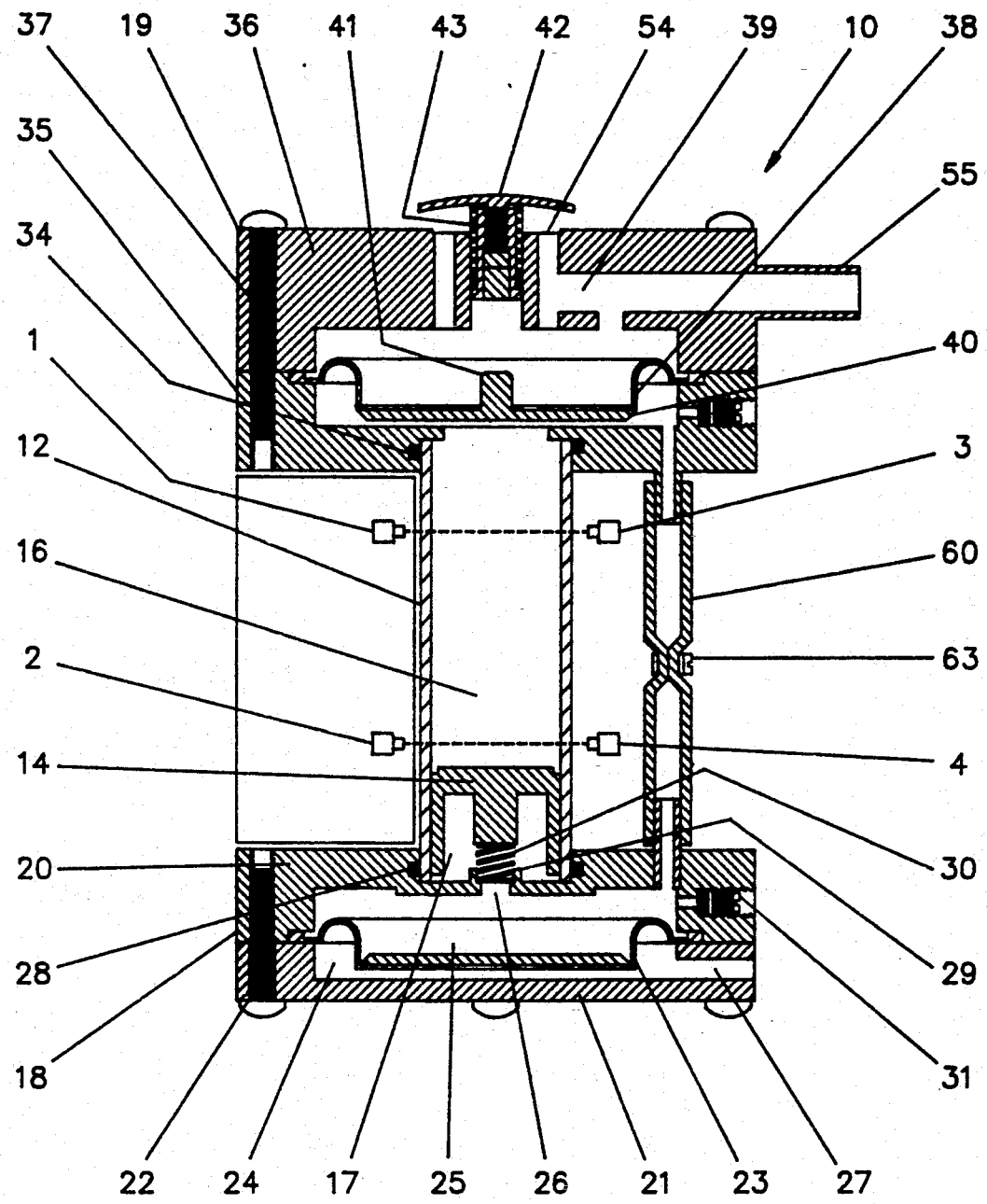
FIG. 1 is a view in vertical section of the manually operable embodiment of the fluid flow measuring device of the present invention.
Figure 1A:
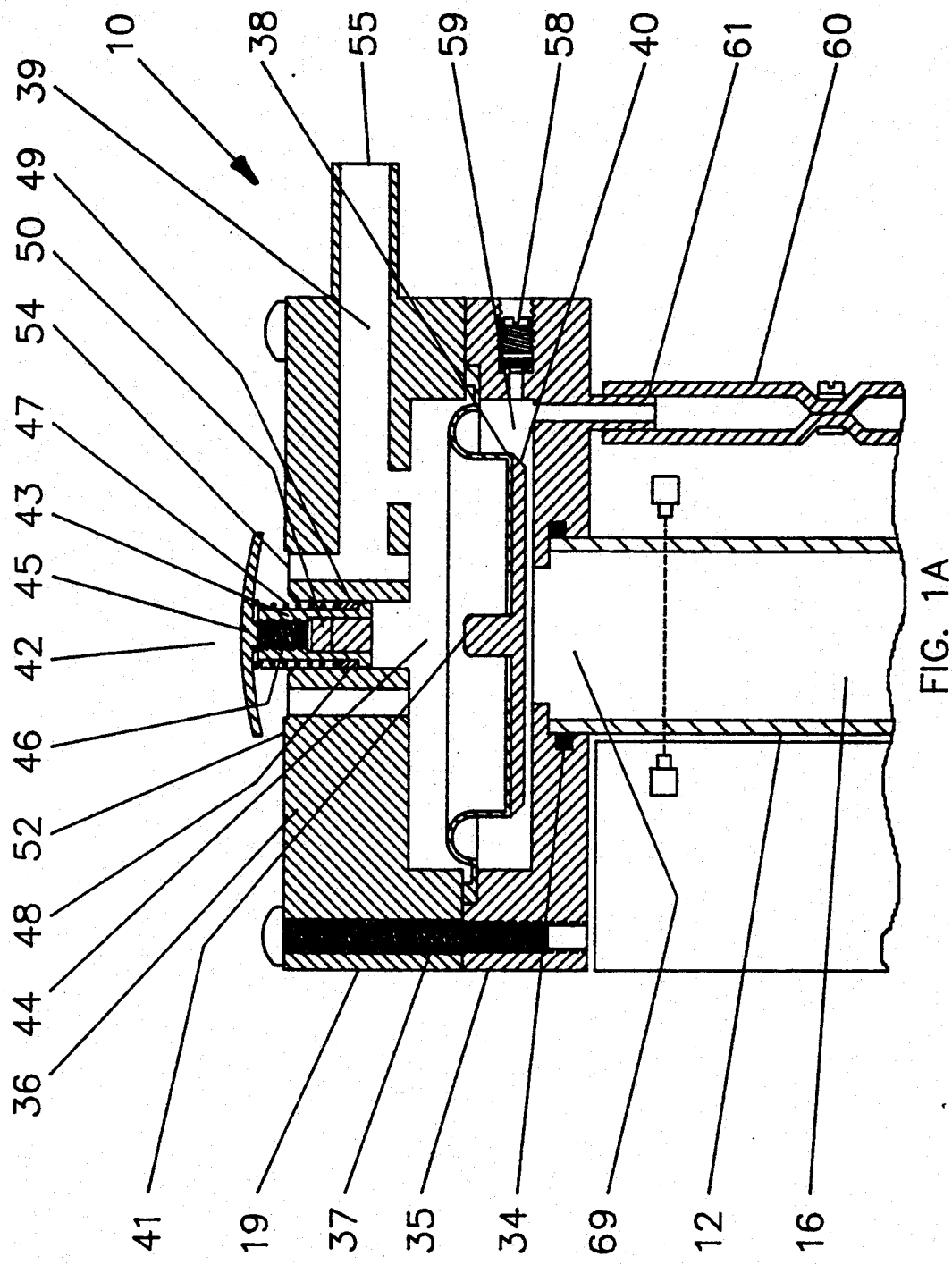
FIG. 1A is an exploded view of the valve and upper platform assembly of FIG. 1.

The fluid flow measuring device of the present invention may be operated manually in a single-acting fashion, as will be further described in connection with FIG. 1, or automatically in a continuous operation, as will be further described in connection with FIGS. 2-5, inclusive. The device (10) as is shown in FIG. 1, comprises a hollow cylindrical open-ended flowtube (12), which is a precision bore glass tube with a lightweight smooth surface piston (14) fitted therein to a tight tolerance, so as to provide a substantially leakproof separation between the upper piston chamber (16) disposed above the piston (14), and the lower piston chamber (17) disposed below the piston (14). As shown in FIG. 1, the flowtube (12) is supported in a substantially vertical position between a lower housing assembly (18) and an upper housing assembly (19), forming a dumbbell-shaped configuration. The vertical orientation is preferred, although the device (10) is equally operable in a horizontal position.

The lower housing assembly (18) includes a base (20) upon which the flowtube (12) is mounted, a support block (21) to which the base (20) is fixedly attached by a mounting screw (22), and a flexible diaphragm (23) mounted between the base (20) and the support block (21). The flexible diaphragm (23) forms a lower plenum chamber (25), which directly communicates with the lower piston chamber (17) through an opening (26) in the base (20) to seal off the lower piston chamber (17) from the atmosphere. A passageway (27) in the block (21), provides access from the atmosphere to the cavity (24) on the underside of the diaphragm (23). An 0-ring (28) provides a seal between the bottom end of the flowtube (12) and the base (20). A hollow insert (29), to which a spring (30) is attached, is seated in the opening (26) to cushion the fall of the piston (14) in its descent from the top end of the flowtube (17), as will be further explained in connection with the description of the operation of the device (10). A purge valve (31) in the base (20) of the lower housing assembly (18) permits ingress to the lower plenum chamber (25) for filling up the flowtube (12) through the chamber (25) with a dry gas, such as dry pure air, nitrogen, or an inert gas.

The upper housing assembly (19) includes a baseplate (35) upon which the top end of the flowtube (12) is mounted, and a support block (36) to which the baseplate (35) is connected by means of a mounting screw (37). An 0-ring (34) provides a seal between the top end of the flowtube (12) and the baseplate (35). A flexible upper diaphragm (38) is supported between the support block (36) and the baseplate (35) to seal off the upper piston chamber (16) from the atmosphere. The upper diaphragm (38) forms a plenum chamber (39) contiguous with the top side thereof, and a chamber (59) contiguous with the underside. The chamber (59) communicates with the upper piston chamber (16) through a bore (69) in the baseplate (35). The upper flexible diaphragm (38) is affixed to a retaining plate (40) having an upright member (41) extending into the chamber (39). The upper housing assembly (19) contains a valve (42) for manually activating the device (10), as will be explained hereafter in detail. The valve (42) has a movable stem (43), which is slidably mounted in a bore (44) extending through the block (36) in vertical alignment with the upright member (41), and a flexible head (45) which is threadably connected to the stem (43) through an adjustable screw (46). A compression spring (47) surrounds the stem (43) and is maintained in a fixed position disposed between the head (45) and a steel ring (48). The steel ring (48) is press-fitted within the bore (44) after the valve (42) is inserted into the bore (44). The adjustment screw (46) is connected to a permanent magnet (50), which forms a magnetic latch with the steel ring (48), when the flexible valve head (45) is depressed. The magnetic latch holds the flexible head in a closed position over the valve seat (52). In the closed position, the valve head (45) covers a cylindrical channel (54) formed in the support block (36). The channel (54) communicates with the chamber (39) and is open to the atmosphere when the valve head (45) is lifted. A discharge boss (55) extends through the block (36) into the chamber (39) and is adapted for connection to the suction side, of a pump (not shown) for pumping air from the chamber (39). Unless the flexible head (45) is depressed, air from the atmosphere will pass through the channel (54) into the chamber (39) and through the boss (551, to the pump (not shown), thereby bypassing the device (10).

To actuate the device (10), the boss (55) is connected to the suction side of a pump (not shown), and the flexible head (45) is manually depressed, closing off access to the atmosphere through the channel (54). With the head (45) depressed, the upper diaphragm (38) will rise, causing the pressure in the upper piston chamber (16) to drop which, in turn, causes the piston (14) to rise. This decreases the pressure in the piston chamber (17) below the piston (14), which causes the lower diaphragm (23) to rise in concert with the upper diaphragm (38). The piston (14) will continue to rise until the upright projecting member (41) engages the stem (43) of the valve (42), and lifts the stem (43) to open the valve seat (52), and to disengage the magnetic latch. The shoulder (49) extending from the stem (43) will hit the steel ring (48) to prevent further upward movement. Once the valve seat (52) is opened, the valve head (45) must be depressed to reoperate the device. The spring (47) helps to lift the head (45) off the valve seat (52). As air is again drawn into the chamber (39) from the atmosphere, the upper diaphragm (38) will return to its initial position, and the piston (14) will fall back to its starting position, as shown in FIG. 2. The descent of the upper diaphragm (38) controls the descent of the piston (14) in addition to the influence of gravity. However, gravity is not needed, which permits the device to be operated in a horizontal position.

The movement of the piston (14) is optically detected by conventional photoelectric devices (1), (2), (3), and (4), with the set of devices (1) and (2) representing optical transmitters, and (3) and (4) representing corresponding optical receivers, respectively. Flow is measured by computing the displacement in time between detected signals at the intercepted locations of the photoelectric devices. The computation may be automatic, by connection of the photoelectric devices to a microcomputer (not shown), programmed to time the interval between detected signals, and to compute flowrate therefrom in a conventional manner, as is well known to those skilled in the art.

A purge valve (58) in the baseplate (35) of the upper housing assembly (19) provides access to the chamber (59), which, in conjunction with the purge valve (31) in the lower housing assembly (18) permits the flowtube (12) to be readily filled or refilled with a defined gas or liquid. A tube (60) interconnects the chamber (59) through boss (61), to the plenum chamber (25) through boss (62). A pinch valve (63) is used to keep the tube (60) normally closed. Opening the pinch valve (63) permits the pressures in chamber (25) and (59) to be equalized.

Automatic and continuous operation is accomplished using the device (11), as shown in FIGS. 2-5, which is substantially equivalent in construction to the device (10) of FIG. 1, with the same reference numbers used in each of the corresponding figures to identify corresponding parts. The difference between the device (11) of FIGS. 2-5, and the device (10), as discussed hereinabove, resides in the use of an arrangement for coupling the stem (43) of the valve (42) with the diaphragm (38) through upright projecting members (70) and (71), which correspond to the upright projecting member (41) of FIG. 1, and in the use of an auxiliary, manually operated bypass valve (75) to manually open or close the inlet port (77) to the chamber (39).

Figure 2A:
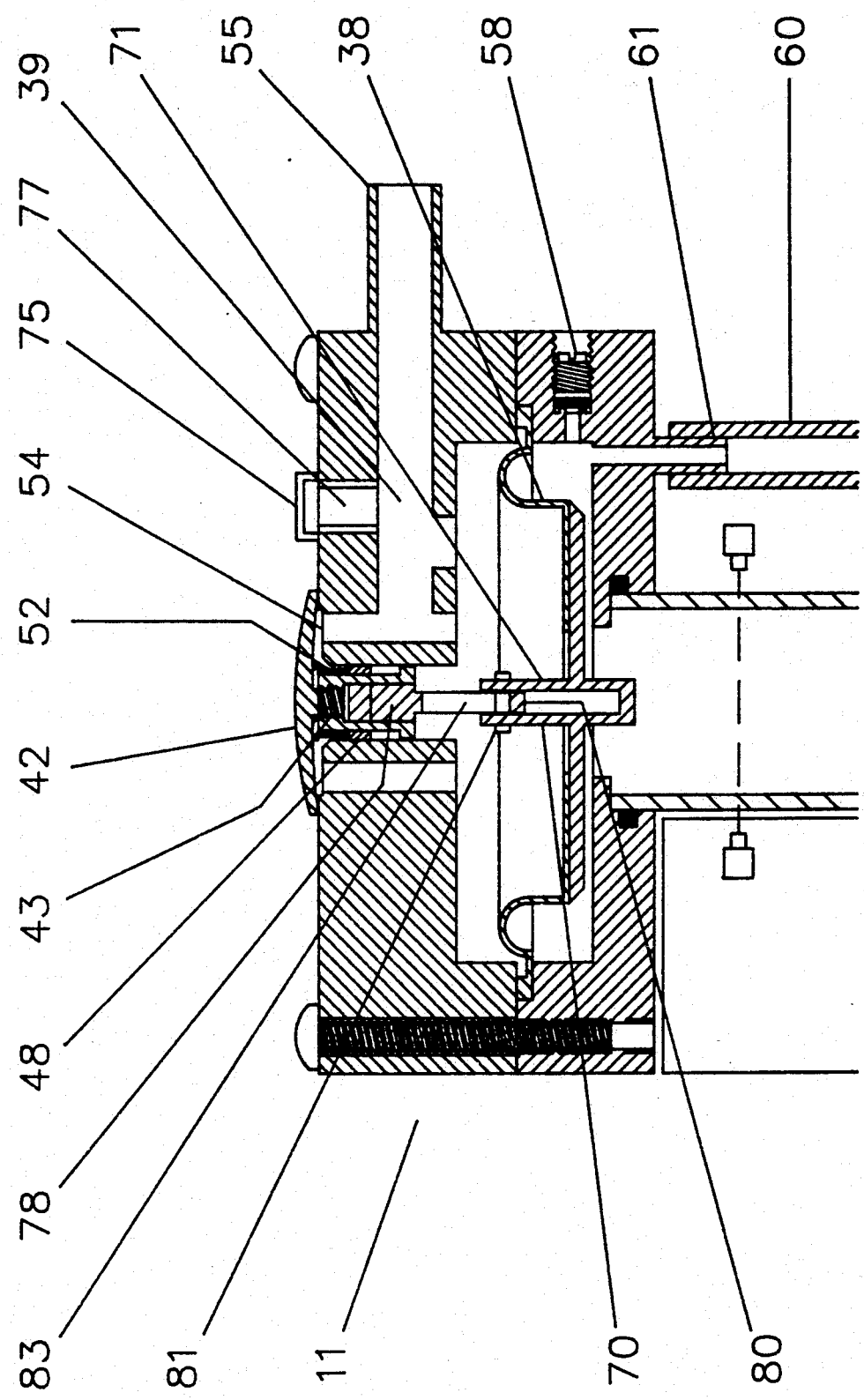
FIG. 2A is an exploded view of the valve and upper platform assembly of FIG. 2.
Figure 2:
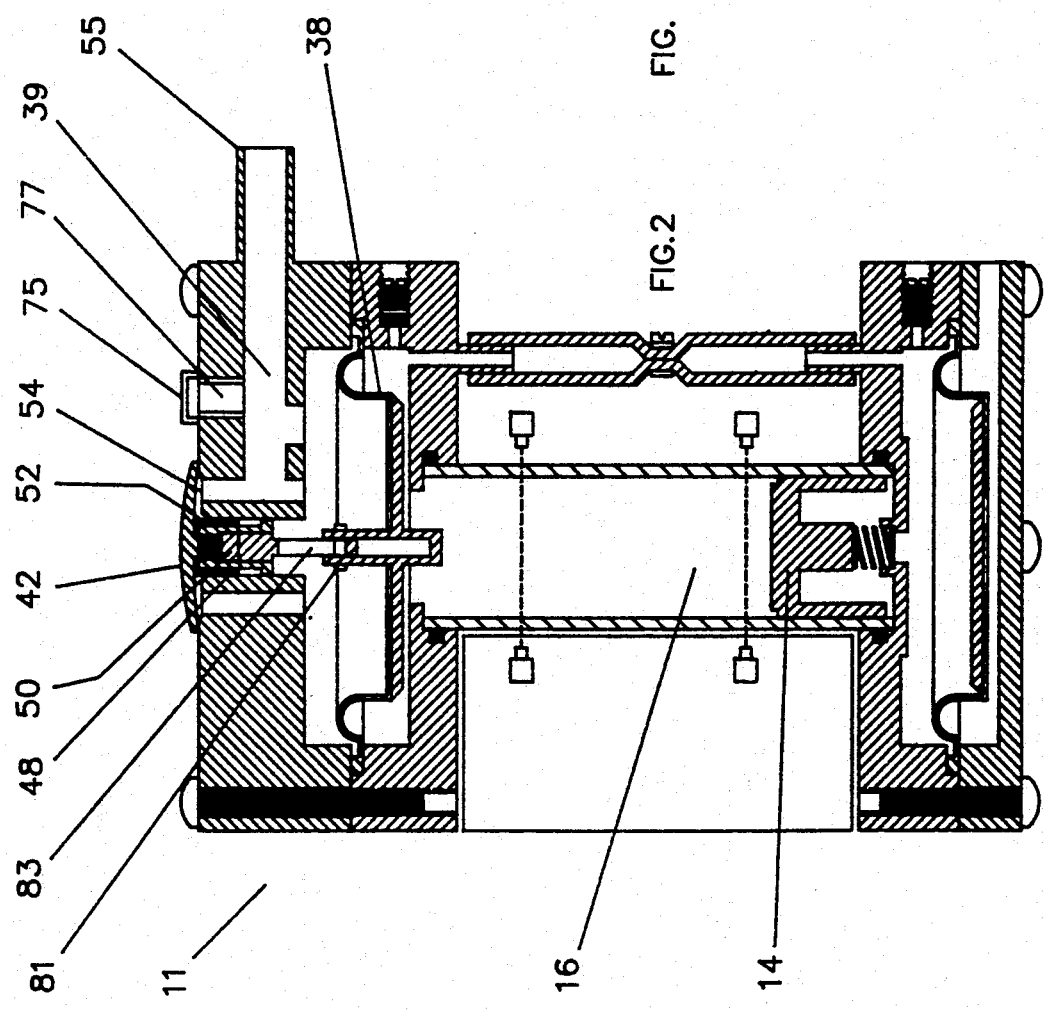
FIG. 2 is a view in vertical section of the automatically operable embodiment of the fluid flow measuring device of the present invention.

As shown in FIG. 2, and more explicitly in FIG. 2A, the adjustment screw (78) extends through the valve stem (43) and is joined to an oval member (80) having an open slot (83). An eyelet (81), connecting the upright member (70) to the upright member (71), extends through the slot (83) in the oval member (80), thereby coupling the valve stem (43) to the diaphragm (38). This automatically pulls the valve (42) into the closed position as the piston (14) descends to its bottom position (as will be more elaborately explained hereafter), and opens the valve (42) in the upper piston position.

Figure 3:
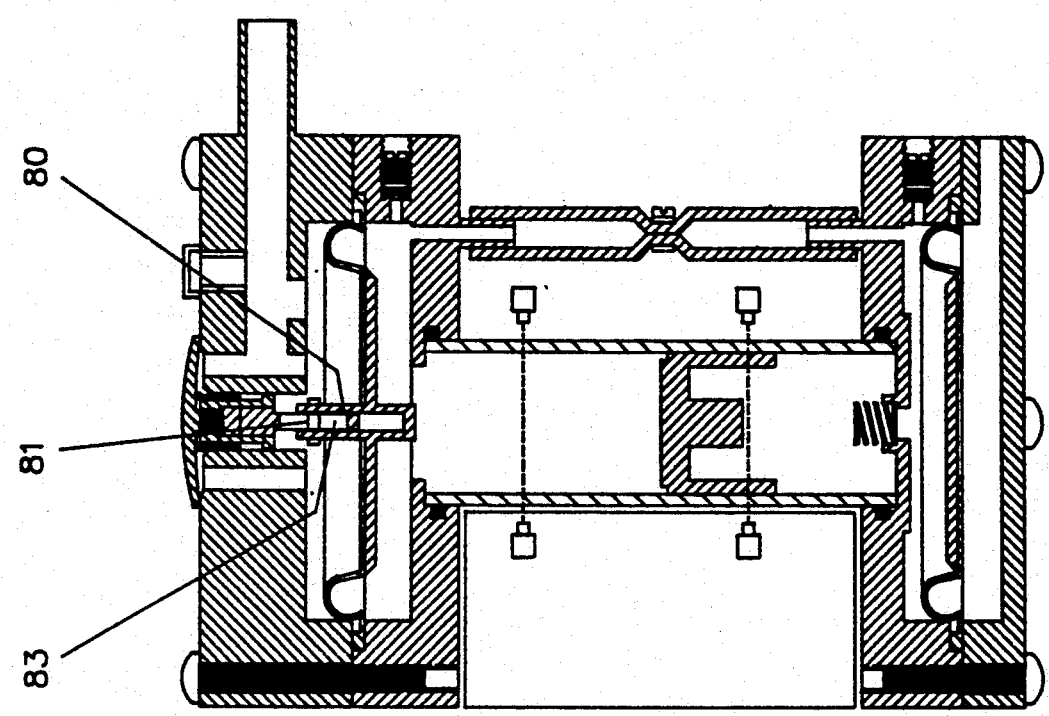
FIG. 3 is a view similar to FIG. 2, showing the piston in an intermediate relative position between the bottom and the top end of the piston stroke.
Figure 4:
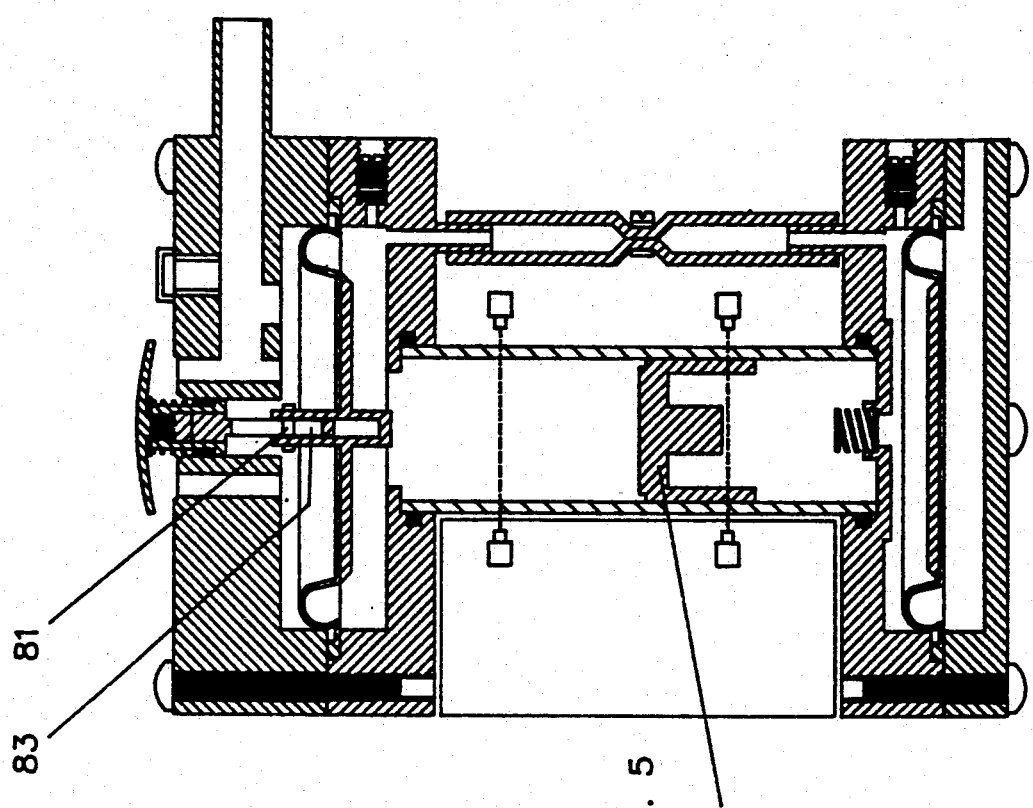
FIG. 4 is another view of the device of FIG. 2, showing the piston at the top end of its stroke.
Figure 5:
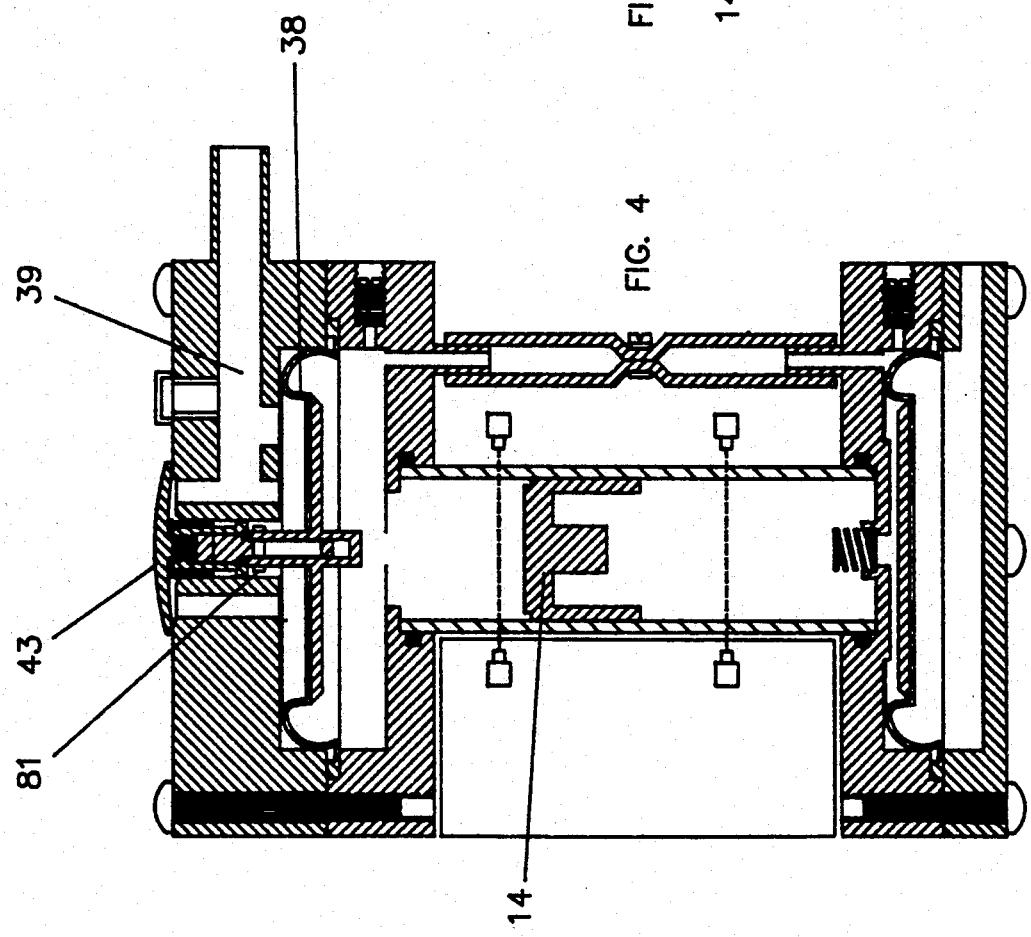
FIG. 5 is yet another view of the embodiment of FIG. 2, showing the piston in descent as it moves from the top end of the piston to the bottom end.

The operation of the device (11) of FIGS. 2-5 parallels the operation of the device (10) of FIG. 1. In FIG. 2, the valve (42) is shown in the closed position, thereby closing off the valve seat (52), and preventing access to the atmosphere through the channel (54). The auxiliary, manually operated bypass valve (75) is presumed closed, thereby preventing access to the atmosphere through the inlet port (77). Should the auxiliary valve (75) be opened, a direct passageway is provided between the atmosphere, chamber (39), and the discharge boss (55), thereby totally bypassing the device (11), as if it were not in use. The discharge boss (55) is connected to the suction side of the pump (not shown) for measuring air flow through the pump. The diaphragm (38) will rise, as shown in FIG. 3, due to the pressure drop in the chamber (39), which decreases the pressure in the upper piston chamber (16), causing the piston (14) to rise. The eyelet (81) rides up the slot (83) in the oval member (80), as shown in FIGS. 3 and 4, until (as shown in FIG. 4), the piston (14) has approximately reached the upper end of its stroke, with the eyelet (81) abutting the oval member (80), and in a position to urge the valve stem (43) upward. Further, upward movement opens the valve (42), causing air to flow into the chamber (39), as explained heretofore in connection with the operation of the device (10). The diaphragm (38) is now urged downward due to the ingress of atmospheric air into chamber (39), which causes the piston to descend. The descent of the piston (14) is controlled by the movement of the diaphragm and, to a lesser extent, gravity as shown in FIG. 5. As the eyelet (81) reaches the bottom end of the slot (83), it pulls the valve stem (43) downward. When the piston (14) reaches the bottom end of its stroke, the steel ring (48) is latched to the magnet (50), closing the valve (42), as shown in FIG. 2. However, unlike the device (10), the device (11) is now primed to automatically renew its operation, as explained above, following the sequence from FIG. 2 to FIG. 5, and back.

It is a major advantage of the system of the present invention to use the gain associated with the diaphragm area selections and their dynamic spring rates to minimize the pressure associated with the flow measurement. The spring rate creates a positive pressure in the piston chamber to permit control of the piston which negates the need for a gravity return. Thus the piston weight can be minimized to allow the design to approach the ideal massless piston design. It should also be understood that the system may be operated by connecting the discharge boss (55) to the pressure side of the pump as opposed to the suction side. However, to operate under pressure the operation of valve (42) would have to be reversed. This is also true if the fluid is a liquid.

What I claim is:

1. A fluid flow measuring device comprising:
   a hollow flowtube having first and second opposite open ends and a movable piston disposed therein for movement between said opposite ends, respectively;
   first means for enclosing said first open end of said flowtube, with said first means comprising: a flexible diaphragm for sealing said flowtube at said first open end from the ambient atmosphere; a housing surrounding said flexible diaphragm; a plenum chamber in said housing adjacent said flexible diaphragm, with said flexible diaphragm separating said plenum chamber from said flowtube; inlet means for connecting said plenum chamber to an external source of fluid; valve means connected to said housing and having an open position in which said plenum chamber is open to the atmosphere for causing said piston to move to said second open end, and a closed position for causing said piston to move to said first open end; means connected to said flexible diaphragm for switching said valve means into said open position when said piston reaches a position adjacent to said fist open end; and means for switching said valve means into said closed position when said piston reaches a position adjacent to said second open end;
   second means for enclosing said second open end of said flowtube, with said second means comprising: a diaphragm for sealing said flowtube at said second open end from the ambient atmosphere; a housing surrounding said diaphragm; said housing having a plenum chamber adjacent said diaphragm on one side thereof in communication with said second open end of said flowtube and a cavity adjacent the opposite side of said diaphragm; inlet means for coupling said cavity to said external source of fluid; and
   means for optically detecting the movement of said piston between selected positions along said flowtube.

2. A fluid flow measuring device, as defined in claim 1, further comprising manual means for moving said valve means into said closed position.

3. A fluid flow measuring device, as define d in claim 2, further comprising magnetic latching means for holding said valve means in said closed position.

4. A fluid flow measuring device, as defined in claim 3, wherein said diaphragm in said first means is connected to a retaining plate having an upright member extending into said plenum chamber for moving said valve means from the closed position to the open position.

5. A fluid flow measuring device, as defined in claim 3, further comprising means for equalizing the pressure in the flowtube on opposite sides of said piston before said valve means is operated.

6. A fluid flow measuring device as claimed in claim 5, wherein said device is vertically oriented.

7. A fluid flow measuring device as claimed in claim 6, wherein said valve means comprises a valve stem in vertical alignment with said upright member and a valve head for depressing said valve stem.

8. A fluid flow measuring device as claimed in claim 7, further comprising a spring surrounding said valve stem.

9. A fluid flow measuring device as claimed in claim 8, further comprising an adjustable screw mounted in said valve stem with said magnetic latching means.

10. A fluid flow measuring device, as defined in claim 1, wherein said means for switching said valve means into said open and closed positions comprises common means for coupling said valve means to the diaphragm in said first means, such that when said piston reaches a predetermined position adjacent said first open end of said flowtube, said coupling means opens said valve means, thereby causing said piston to move to the second end of flowtube, and when said piston reaches a predetermined position adjacent said second end, said coupling means closes said valve means.

11. A fluid flow measuring device as claimed in claim 10, wherein sad diaphragm in said first means is connected to a retaining valve plate having an upright member extending into said plenum chamber in engagement with said coupling means.

12. A fluid flow measuring device as claimed in claim 11, further comprising a manually operated valve coupling said plenum chamber to the atmosphere for manually by-passing the automatic operation of said device.

13. A fluid flow measuring device as claimed in claim 12, wherein said device is vertically oriented.

14. A fluid flow measuring device, as defined in claim 11, wherein the fluid in said sealed flowtube is selected from the group consisting of dry air, nitrogen, and inert gas.

15. A fluid flow measuring device, as defined in claim 14, further comprising magnetic latching means for holding said valve means in said closed position.

16. A fluid flow measuring device, as defined in claim 15, further comprising spring means for lifting said valve means.

* * * * *